May 12, 1959
G. E. MITCHELL
2,886,335
VACUUM CHUCK ASSEMBLY
Filed Oct. 1, 1956
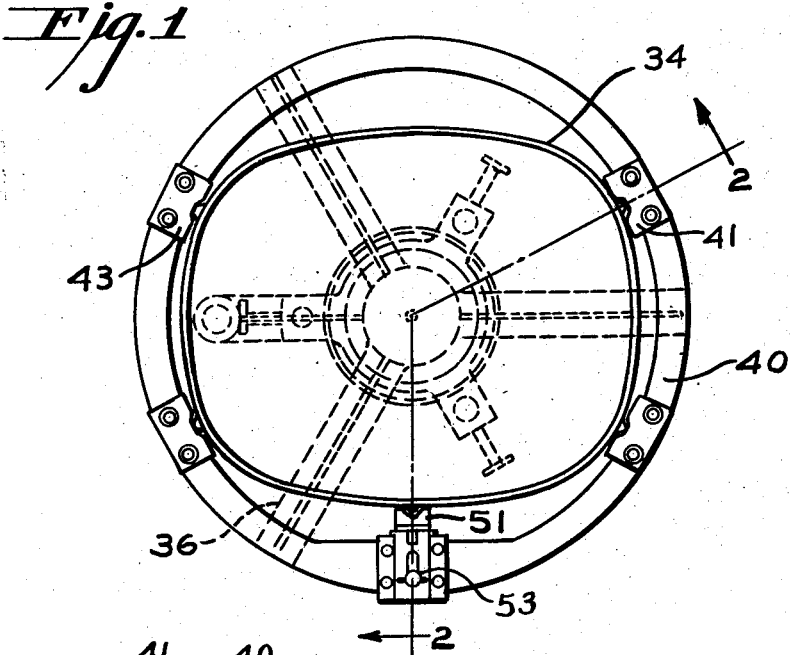
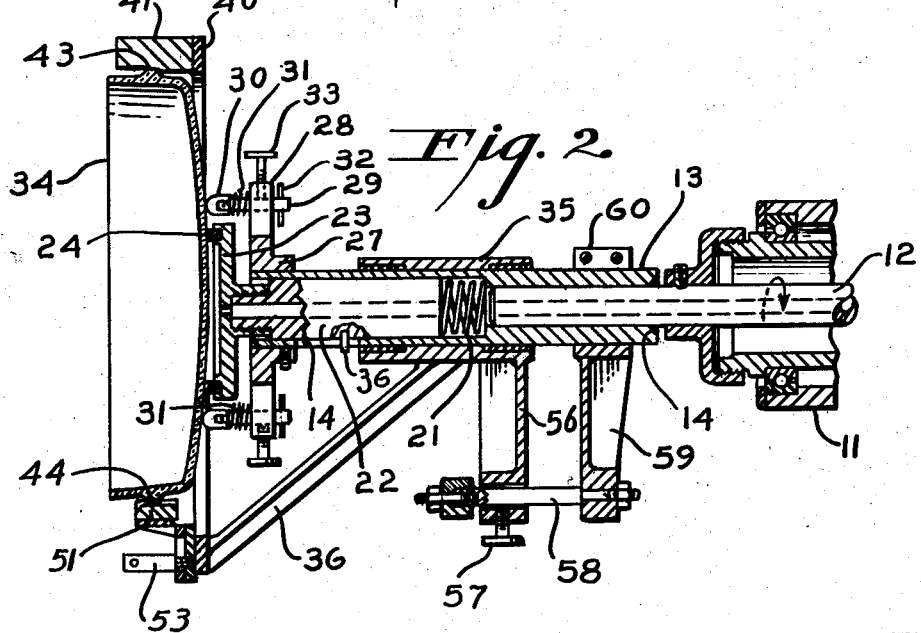
INVENTOR.
GEORGE E. MITCHELL
BY Clarence R. Patty Jr.
ATTORNEY United States Patent Office 2,886,335
Patented May 12, 1959

2,886,335
VACUUM CHUCK ASSEMBLY

George E. Mitchell, Corning, N.Y., assignor to Corning Glass Works, Corning, N.Y., a corporation of New York Application October 1, 1956, Serial No. 613,141

6 Claims. (Cl. 279—3)

The present invention relates to chuck assemblies, but is particularly concerned with the provision of a chuck assembly suitable for precisely aligning, in an electric sealing lathe or the like, two complementary glass parts, such for example as a glass panel of a color television picture tube assembly with its sealing surface aligned with the sealing surface of a funnel portion of the tube suitably chucked in such lathe.

In the sealing of the panel and funnel components of a monochrome television picture tube it has been customary to hold such components in axially aligned chucks of a sealing lathe. The chuck employed to hold the funnel component has been of a mechanical type adapted to externally and internally axially align the funnel neck with the lathe spindles, while the chuck for holding the panel component has been of a simple vacuum cup type adapted to engage the panel face. The positioning of the panel to align its sealing surface with that of the funnel, whether of the round or rectangular type is not critical and has usually been manually accomplished by the lathe operator.

The aligning of the funnel and panel components of color tubes, whether of the round or rectangular type, is extremely critical however, since the panel contains an aperture mask which must be held normal to the axis of the funnel neck and in an exact predetermined rotary position with respect thereto. Moreover, such alignment must be maintained in such a fashion as not to interfere with the subsequent sealing operation.

According to the invention the alignment of a panel with respect to a previously chucked funnel is effected by use of a vacuum chuck assembly that, after seizing a panel, also moves it into engagement with panel aligning blocks that are cooperative with certain reference pads on the panel component and serve to stop the movement of the panel when it has been properly positioned with respect to such blocks. A special block is made cooperative with a reference rib on the panel that enables rotary alignment of the panel with a held funnel.

The presence of such aligning blocks about the panel reference regions during an electric sealing operation is however objectionable, either for the reason that if of metal they may interfere with the proper current flow into the sealing region, or, if of a dielectric material, they are likely to be damaged by heat during such operation and to be inaccurate thereafter.

According to the invention these objections are overcome by use of a set of spring loaded stops surrounding the vacuum chuck and adapted to be engaged and moved to varied alternative positions as the applied vacuum seats the panel within such aligning blocks. The spring loaded stops are then locked in their respective operated positions and are thereafter cooperative with the vacuum chuck to hold the panel in its aligned position independently of the aligning blocks. The aligning blocks can accordingly be removed from association with the panel and the sealing operation proceeded with in the usual fashion.

In the accompanying drawing:

Fig. 1 is an end elevation of a chuck assembly embodying the invention and of a panel held thereby.

Fig. 2 is a sectional side elevation of the chuck assembly and panel taken on line 2—2 of Fig. 1 and also shows, in section, a fragment of a sealing lathe with which such assembly is associated.

Referring to the drawing in detail, the reference numeral 11 designates the tailstock end of a sealing lathe whose tubular spindle 12 has arranged thereabout a sleeve 13 welded at 14 to the spindle 12 and having an enlarged bore in the portion projecting from the inner end of spindle 12. Such enlarged bore portion sleeve 13 is occupied by a compression spring 21 and a tubular piston 22 the outer end of which is of reduced diameter and has threaded thereon a vacuum chuck 23 having an associated panel engaging sealing ring 24. As will be noted piston 22 carries a pin 36 slideable in a slot 14 in sleeve 13 to prevent any relative rotary movement therebetween.

Surrounding the leftward end of sleeve 13 is a hub 27 having three uniformly spaced extended spoke portions such as 28 each pierced to receive a post such as 29. Each post 29 at the end adjacent chuck 23 is provided with a panel engaging button 30. A spring 31 surrounds post 29 and is held partly compressed between the button 30 and the associated extended spoke portion 28 by a pin 32 passing through the opposite end of the post. Thumb screws, such as 33, threaded into the respective extended portions such as 28 enables their posts to be locked into any position that they have been moved by a panel such as 34 seized by chuck 23.

Surrounding sleeve 13 is the hub 35 of a spider having uniformly spaced radiating arms such as 36 whose free ends terminate in the region occupied by the border of a panel held in chuck 23. The arms such as 36 support a ring 40 upon which are mounted a number of panel aligning blocks such as 41 cooperative with pads such as 43 on a panel to vertically align it, and with a notched slideable block 51 cooperative with a rib such as 44 on the panel to positively align the panel in an exact desired rotary position when being placed in position for seizure. A screw 53 enables the block 51 to be locked in position after registering the rib 44 in the notch of such block.

As will be seen, with this form of construction, when a source of vacuum is placed in communication with the outer end of the bore of shaft 12 and a panel such as 34 is placed against chuck ring 24, not only will such panel be seized, but in addition the negative pressure that is created in the bore region of sleeve 13 occupied by spring 21 will cause the piston 22 to move to the right until stopped by the engagement of the panel with the seats of the aligning blocks such as 41. In the meantime the panel also engages the buttons such as 30 and displaces their associated posts, which as previously stated, may be locked in their displaced positions to, in cooperation with chuck 23, hold the panel in its aligned position independently of the aligning blocks.

The spider hub 35 is held fixed with respect to sleeve 13 through the medium of an extension 56 and a set screw 57 that engages a rod 58 carried by an arm 59 depending from a bracket 60 rigidly clamped about the sleeve 13. As will be evident, therefore, by loosening screw 57 the hub 35 is freed for movement to the right, after the posts such as 30 have been locked in their displaced positions to hold the panel in its aligned position independently of the aligning blocks so that the ring 40 may be shifted rightward to remove the aligning blocks from association with the panel to permit the sealing operation to be effected,

What is claimed is:

1. In a chuck assembly, a vacuum chuck adapted to seize an article and to move it toward an alternative position, means arranged for engagement by the article during such movement to determine its alternative position, other means displacable by the article during such movement an extent in accordance with the extent of movement of the article to its alternative position, means for thereafter locking said other means so displaced to hold the article at such alternative position independently of said first means, and means for thereafter enabling the disassociation of said first means from the article while retaining it in such alternative position.

2. In combination, a sleeve, a piston projected through the bore of said sleeve, a vacuum chuck fixed to one end of said piston, a support for said sleeve, a spring in said bore engaging the other end of said piston and normally urging it toward one of two alternative positions, the region of said piston occupied by said spring being in communication with the vacuum chuck whereby its seizure of an article through the connection of a vacuum line thereto reduces the atmospheric pressure in said sleeve bore to effect movement of said piston against the action of said spring to move a seized article toward an alternative position.

3. As an article of manufacture, a shaft, a sleeve projecting from an end of said shaft, a compression spring occupying the region of the bore of said sleeve adjacent such end of the shaft, a piston occupying the remaining portion of such sleeve bore and projecting beyond the free end of the sleeve, a vacuum chuck supported on the projecting end of said piston; said shaft and piston having a common passage therethrough into communication with said chuck whereby, when the chuck is placed in communication with a vacuum line connected to the end of said shaft, movement of the chuck and piston against said spring will be effected following seizure of an article and the resultant closure of the chuck to atmosphere.

4. In a chuck assembly, a vacuum activated portion for holding an article, means cooperative with such portion to establish the holding of an article in a predetermined position, other means engageable by the article and movable to alternative positions by the article in its arrival at such predetermined position, means for locking such other means in their alternative positions to hold the article in such predetermined position independently of said first means, and means enabling the removal of such first means from association with the article while retaining it in such predetermined position.

5. In an article chucking and aligning device, a shaft, a sleeve surrounding said shaft fixed thereto and extending beyond one end thereof, a compression spring arranged within the bore of said sleeve adjacent such end of said shaft, a piston occupying the remainder of the bore of said sleeve, and projecting from the sleeve end, a vacuum chuck carried by the end of said piston, a hub surrounding said sleeve and having arms extending therefrom into a region surrounding said chuck, means associated with said arms including aligning blocks adapted to be engaged by surfaces of an article held in said chuck, an element surrounding the free end of said sleeve having portions at spaced distances thereabout each provided with spring loaded means engageable and movable to an alternative position by an article when seated against said aligning blocks as when an article is held in said chuck, means for locking said spring loaded means in their operated positions whereby they in cooperation with said chuck hold an article in the position previously established by its engagement with said aligning blocks, and means for thereafter enabling the removal of such blocks from association with the article while retaining the article in its aligned position.

6. In a vacuum chuck assembly, a sleeve, a tubular piston having one end thereof projected into the bore of said sleeve, a vacuum chuck attached to the other end of said piston and having a passage in communication with the bore thereof, a tubular shaft having one end projected into the opposite end of said sleeve, and having its opposite end fixed against longitudinal movement, a compression spring arranged between the adjacent ends of said piston and shaft, to normally maintain said piston and chuck in one of two alternative positions and whereby when the chuck is closed to atmosphere by an article brought into seizing relation therewith and a vacuum line connected to said shaft negative pressure established in the sleeve region between the adjacent ends of said piston and shaft overcomes the action of said spring to effect movement of said piston and chuck to the other of their alternative positions.

References Cited in the file of this patent
UNITED STATES PATENTS

| | | |
|---|---|---|
| 2,512,274 | Hawk | June 20, 1950 |
| 2,691,937 | Emerson | Oct. 19, 1954 |
| 2,701,723 | Ekberg | Feb. 8, 1955 |